United States Patent
Mahajan et al.

(10) Patent No.: US 7,757,004 B2
(45) Date of Patent: *Jul. 13, 2010

(54) SYSTEM AND METHOD FOR ENABLING A GRAPHICAL WINDOW MODIFICATION COMMAND TO BE APPLIED TO A REMOTELY GENERATED GRAPHICAL WINDOW

(75) Inventors: Rajneesh Mahajan, Bellevue, WA (US); Ivan J Leichtling, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/413,209

(22) Filed: Mar. 27, 2009

(65) Prior Publication Data
US 2009/0193340 A1 Jul. 30, 2009

Related U.S. Application Data

(63) Continuation of application No. 11/158,229, filed on Jun. 21, 2005, now Pat. No. 7,533,189.

(51) Int. Cl.
G06F 15/16 (2006.01)
(52) U.S. Cl. ............... 709/248; 709/203; 709/205; 709/219; 709/223; 709/246; 715/800; 715/804
(58) Field of Classification Search ............. 709/203, 709/205, 217, 219, 223, 246, 248; 715/788, 715/800, 804
See application file for complete search history.

(56) References Cited

U.S. PATENT DOCUMENTS

| 5,255,361 | A | 10/1993 | Callaway et al. |
| 5,758,110 | A | 5/1998 | Boss et al. |
| 6,437,803 | B1 | 8/2002 | Panasyuk et al. |
| 6,901,435 | B1 | 5/2005 | Sulcer et al. |
| 6,971,110 | B1 * | 11/2005 | Marks et al. ............... 719/318 |
| 6,989,836 | B2 | 1/2006 | Ramsey |
| 7,046,134 | B2 * | 5/2006 | Hansen ...................... 709/204 |
| 7,140,024 | B2 | 11/2006 | Kaulgud et al. |
| 7,533,189 | B2 * | 5/2009 | Mahajan et al. ............ 709/248 |
| 2002/0057295 | A1 | 5/2002 | Panasyuk et al. |
| 2003/0177172 | A1 | 9/2003 | Duursma et al. |

(Continued)

FOREIGN PATENT DOCUMENTS

EP 1215570 A1 6/2002

OTHER PUBLICATIONS

"BrianMadden.com—Technical Articles", at <<http://www.brianmadden.com/tag/originals/rss/Microsoft-Terminal-Services>>, 2007, pp. 66.

(Continued)

Primary Examiner—Oanh Duong
(74) Attorney, Agent, or Firm—Lee & Hayes, PLLC

(57) ABSTRACT

Techniques relating to enabling a graphical window modification command to be applied to a remotely generated graphical window are described. In one instance, a process detects a user command to modify a remotely generated application graphical window in a remote terminal session. The process determines whether to initiate the user command at a local machine upon which the remotely generated application graphical window is displayed or at a remote machine which generated the remotely generated application graphical window.

20 Claims, 8 Drawing Sheets

U.S. PATENT DOCUMENTS

| | | |
|---|---|---|
| 2004/0128399 A1 | 7/2004 | Kurrasch |
| 2005/0081158 A1 | 4/2005 | Hwang |
| 2005/0166214 A1 | 7/2005 | Kaulgud et al. |
| 2005/0240873 A1 | 10/2005 | Czerwinski et al. |
| 2005/0278698 A1 | 12/2005 | Verco |
| 2006/0288306 A1 | 12/2006 | Mahajan et al. |

OTHER PUBLICATIONS

Wickett, "Extending Microsoft's Terminal Services Client to Provide Seamless Windows", at <<http://www.codeproject.com/internet/tswindowclipper.asp>>, Code Project, 2007, pp. 4.

* cited by examiner

SYSTEM AND METHOD FOR ENABLING A GRAPHICAL WINDOW MODIFICATION COMMAND TO BE APPLIED TO A REMOTELY GENERATED GRAPHICAL WINDOW

RELATED APPLICATION

This application is a continuation of co-pending U.S. patent application Ser. No. 11/158,229, entitled "Enabling a Graphical Window Modification Command to be Applied to a Remotely Generated Graphical Window" to Mahajan et al., filed on Jun. 21, 2005, which is incorporated by reference herein for all that it teaches and discloses.

BACKGROUND

Remote terminal session support products, such as the Terminal Services™ product offered by Microsoft Corporation, enable a remote terminal session between a client machine and a server machine. The remote terminal session (RTS) can enable graphical user interface windows (hereinafter, "graphical windows"), such as application graphical windows, to be generated on the server machine. RTS enables a representation, such as a bit map image, of the remotely generated graphical window to be displayed on the client machine. The client machine also may itself generate application graphical windows for display on the client machine. A user of the client machine may engage one or both of the locally generated application graphical windows and the remotely generated application graphical windows. A continuing need exists for techniques which offer a similar functionality for both locally generated application graphical windows and remotely generated application graphical windows.

SUMMARY

Techniques relating to enabling a graphical window modification command to be applied to a remotely generated graphical window are described. In one instance, a process detects a user command to modify a remotely generated application graphical window in a remote terminal session. The process determines whether to initiate the user command at a local machine upon which the remotely generated application graphical window is displayed or at a remote machine which generated the remotely generated application graphical window.

DETAILED DESCRIPTION

Overview

Figure 1:
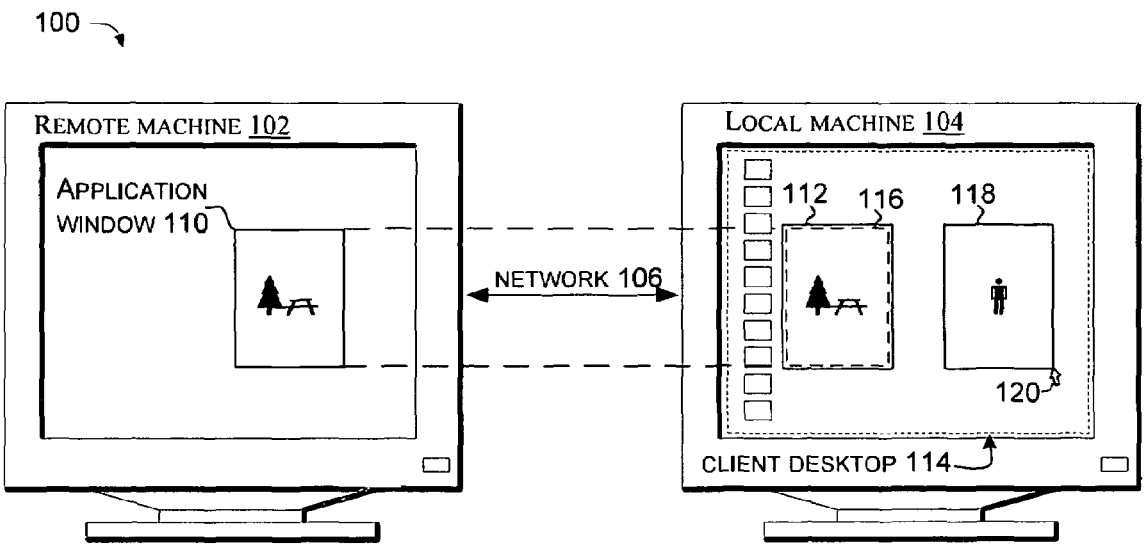
FIGS. 1-6 illustrate an exemplary system for enabling a graphical window modification command to be applied to a remotely generated graphical window in accordance with one implementation.
Figure 2:
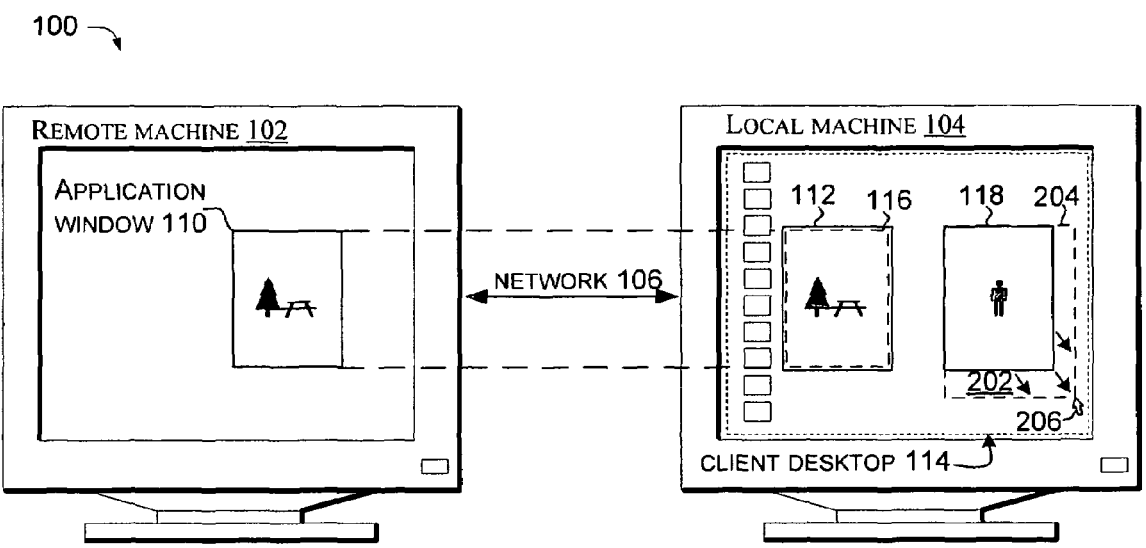
Figure 3:
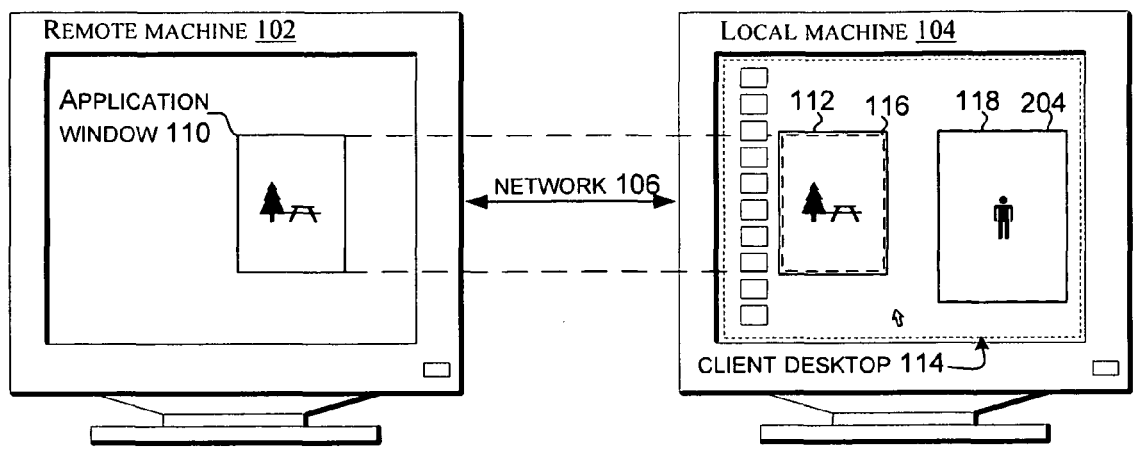
Figure 4:
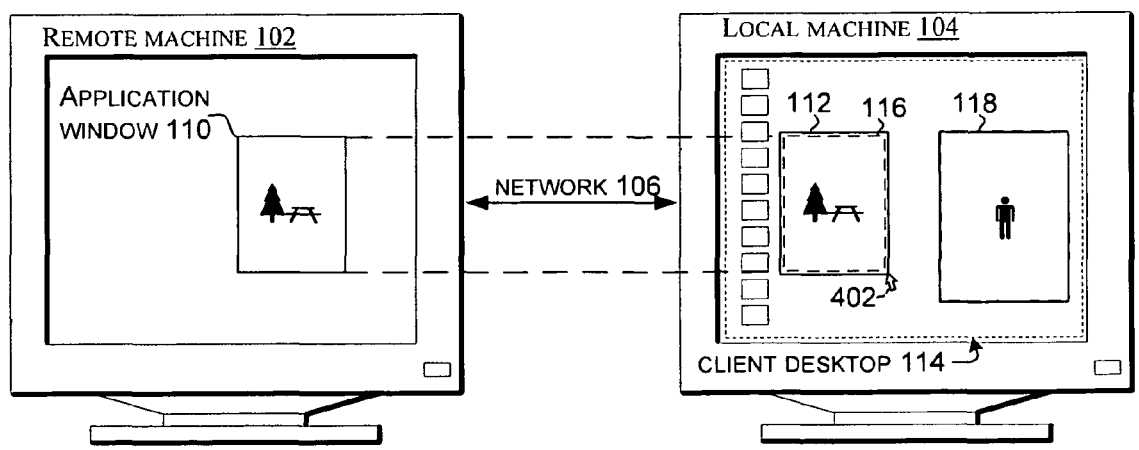
Figure 5:
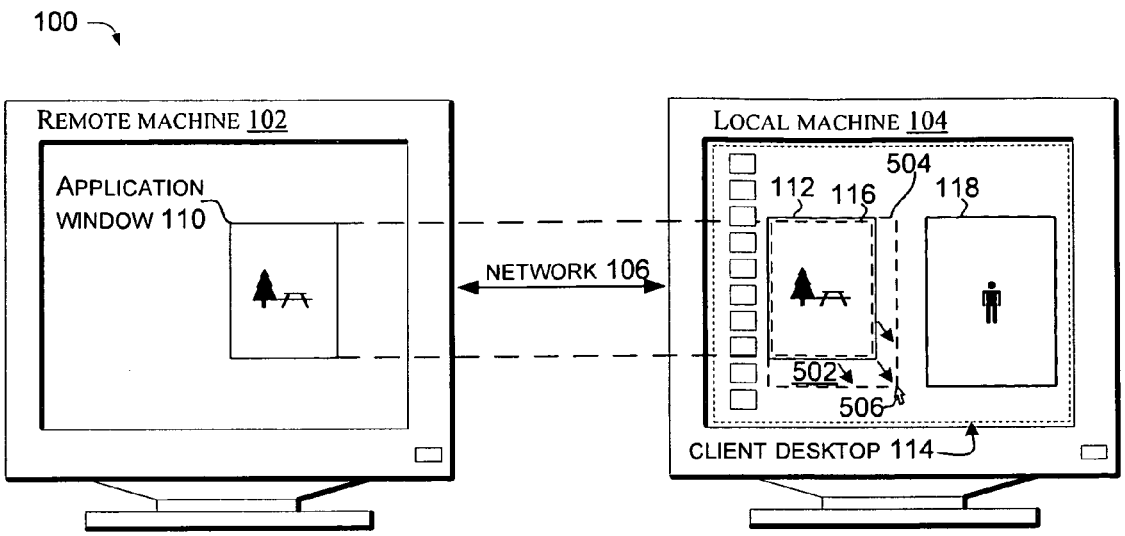
Figure 6:
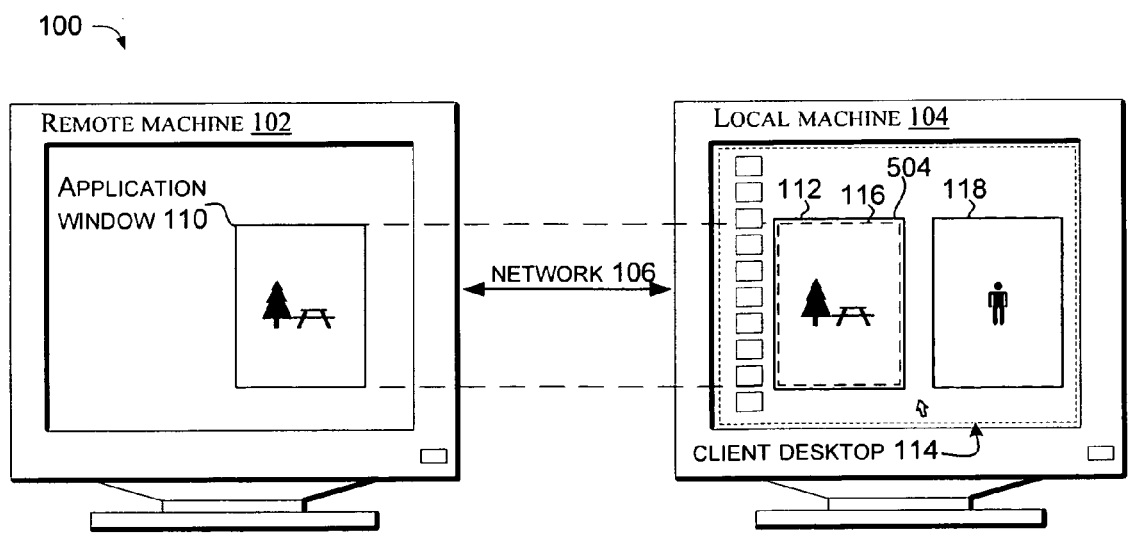

In a standalone computing scenario, a user engages a machine configured to generate a user-interface including one or more application graphical windows. The user may desire to modify individual application graphical windows. For instance, the user may desire to modify an individual application graphical window by moving or resizing the graphical window. During the move/resize process, the machine's operating system generally provides some visual indication of the graphical window so that the user can visualize the new graphical window size and/or position. At least some operating systems allow the user to select how the application graphical window appears during the move/resize process. For instance, some operating systems allow the user to select from a full-window mode or an outline mode. Full-window mode continuously updates essentially the entire application graphical window during the move/resize process. The updates end when the user ends the move/resize commands and the move/resize is completed. In outline mode, a dashed line indicating a new position/size of the graphical window is generated during the move/resize process. When the move/resize process is finished (e.g. by lifting the mouse button) the dashed line disappears and the application graphical window is updated to the new position/size.

Remote terminal sessions involve a first remote machine acting as a server configured to remote data to a second local machine acting as a client. Just as in the standalone configuration, the local machine which the user engages may be configured to generate one or more locally generated application graphical windows and may further allow the user to specify a mode for move/resize operations of the locally generated application graphical windows. Applications operating on the remote machine can generate server application graphical windows. The remote terminal session is configured to enable output or graphics of the server application graphical window(s) to be forwarded to the local machine. A proxy window is created on the local machine and the server application's graphics are painted over the proxy graphical window to create a local representation of the remotely generated server application graphical window. The present implementations enable the user-selected move/resize mode of the local machine to be applied to the remotely generated application graphical windows. At least some implementations achieve seamless move/resize operations such that a user may be unable to distinguish locally generated application graphical windows from remotely generated application graphical windows based upon the move/resize characteristics.

In a general sense, in at least some of the present implementations, user commands to modify a graphical window involved in a remote terminal session are sent from a client machine to a server machine which generated the graphical window. The commands can be handled at the server machine which then updates the graphical window accordingly. The updates are subsequently sent to, and reflected at, the client side. Alternatively, the commands can be sent back to the client machine. The client machine can implement the commands at the client side and send data back to the server to allow the server to resynchronize the graphical window to reflect the client side modifications.

Exemplary Systems

For purposes of explanation, collectively consider FIGS. 1-6 which illustrate a system 100 configured to support a remote terminal session between a remote machine 102 and a local machine 104 over a network 106. Remote machine 102 is configured to generate a server application graphical window 110. The skilled artisan should recognize that although the server application graphical window 110 is visually represented here for purposes of explanation, the present implementations function without actually generating a visual image at the remote machine. The remote terminal session provides a means for a representation of the remote machine's server application graphical window 110 to be sent to local machine 104 over network 106. For instance, the representation may be a bit-map image, among others. The remote terminal session further causes a proxy graphical window 112 to be generated at the local machine 104 on a client desktop 114. The server application graphical window's representation, designated here as remotely generated application graphical window 116 can be painted or displayed over proxy graphical window 112. For purposes of illustration a locally or client generated application graphical window 118 is also illustrated on client desktop 114 of local machine 104. For purposes of explanation the terms locally and remotely are used herein from the point of view of a user positioned at the machine configured to display both locally and remotely generated application graphical windows. Further, for purposes of illustration, remotely generated application graphical window 116 is illustrated here as occupying a sub-set of the area of proxy graphical window 112. In many instances, remotely generated application graphical window 116 is painted over essentially all of the proxy graphical window such that the proxy graphical window is not visible. Further, while the application graphical windows illustrated here generally approximate rectangles, at least some of the implementations are suitable for use with any shape of application graphical window including irregular shapes. System 100 is configured to enable a graphical window modification command to be applied to remotely generated graphical window 116. In this particular implementation, system 100 is further configured to support a user-selected mode for application graphical window move/resize operations whether the graphical window is locally generated or remotely generated.

Assume for purposes of explanation that a user of local machine 104 has selected a graphical window move/resize outline mode for local machine 104. Assume further that the user desires to expand locally generated application graphical window 118 from a first size indicated in FIG. 1 to a larger size evidenced in FIG. 3. The user can accomplish such a move through various user commands which initiate a graphical window move/resize process. For instance, one type of user command is a system command via a system menu. Other types of user commands which can initiate a graphical window move/resize process can include, voice recognition, camera based gesture recognition, and keyboard input, among others. Still another type of user command involves directing a mouse cursor over the graphical window and pressing and holding a mouse button while dragging to a new location. For instance, the user may click on an edge of the locally generated graphical window, such as the bottom right edge of locally generated application graphical window 118, as indicated generally at 120. For instance, the user can depress and hold a mouse button and drag down and to the right, as indicated generally by arrows 202. Local machine 104 creates an outline 204 of the locally generated application graphical window 118 which follows the mouse movement until the mouse button is released, such as is indicated generally at 206. Release of the mouse button indicates that the user's resize is complete. Upon completion of the user's resize, the locally generated application graphical window 118 is adjusted to match the outline 204 as can be appreciated from FIG. 3.

Now further assume that the user wants to accomplish a resize of remotely generated application graphical window 116. The user may or may not be able to distinguish whether remotely generated application graphical window 116 is a locally generated application graphical window or a remotely generated application graphical window. For instance, the user can click on what the user perceives to be the bottom right corner of remotely generated application graphical window 116 as indicated generally at 402. The user sees remotely generated application graphical window 116, but from a remote terminal session perspective, the user is clicking on the underlying proxy window 112 upon which remotely generated application graphical window 116 is painted. System 100 is configured to detect user commands relating to moving/resizing the proxy graphical window 112 and to forward the commands to the server side.

In this instance, the user down clicks on the mouse on the bottom right edge or corner of the remotely generated application graphical window 116 and/or underlying proxy graphical window 112. Assume that the user clicks at 402 and begins to drag down and to the right as indicated generally by arrows 502. System 100 responsively generates an outline 504 of proxy graphical window 112 which follows the user's cursor 506 until the user releases or up-clicks the cursor such as at the location indicated by the presence of cursor 506 in FIG. 5. During the drag operation, part of outline 504 is outside the remote application's graphical window area. As such, in this instance, where the user has selected outline mode, user commands for move/resize are handled on the local machine 104 to begin a move/resize corresponding to the client commands.

Upon completion of the user's resize command, the proxy graphical window 112 is updated to the size of outline 504. The remote machine then updates application graphical window 110 relative to the updated proxy graphical window size/location. A corresponding updated remotely generated application graphical window 116 is sent to local machine 104 to synchronize the remotely generated application graphical window 116 with the proxy graphical window 112 as can be appreciated from FIG. 6. System 100 enables move/resize functionality for a remotely generated application graphical window which approximates or mimics a move/resize functionality of a locally generated application graphical window. While a graphical window resize is described above for purposes of explanation, a graphical window move can be handled in a similar manner.

The implementations described above and below are described in the context of a computing environment as commonly encountered at the present point in time. Various examples can be implemented by computer-executable instructions or code means, such as program modules, that are executed by a computer, such as a personal computer or PC. Generally, program modules include routines, programs, objects, components, data structures and the like that perform particular tasks or implement particular abstract data types.

Various examples may be implemented in computer system configurations other than a PC. For example, various implementations may be realized in hand-held devices, multiprocessor systems, microprocessor-based or programmable consumer electronics, network PCs, minicomputers, mainframe computers, cell phones and the like. Further, as technology continues to evolve, various implementations may be realized on yet to be identified classes of devices. For example, as the cost of a unit of processing power continues to drop and wireless technologies expand, computing devices resembling today's cell phones may perform the functionalities of today's PC, video camera, cell phone, and more in a single mobile device. This single device may in one scenario act as a server and in another scenario act as a client. This is but one of many existing and developing examples for the described implementations.

The terms server and client as used herein do not connotate any relative capabilities of the two devices. The client may have more, less, or equal processing capabilities than the server. Rather, in this document, the names server and client describe the relative relationship of the two components. For example, a computing experience of a first or server device is remoted to a second or client device.

Although the various implementations may be incorporated into many types of operating environments as suggested above, a description of but one exemplary environment appears in FIG. 11 in the context of an exemplary general-purpose computing device and which is described in more detail later in this document under the heading "Exemplary Operating Environment".

Figure 7:
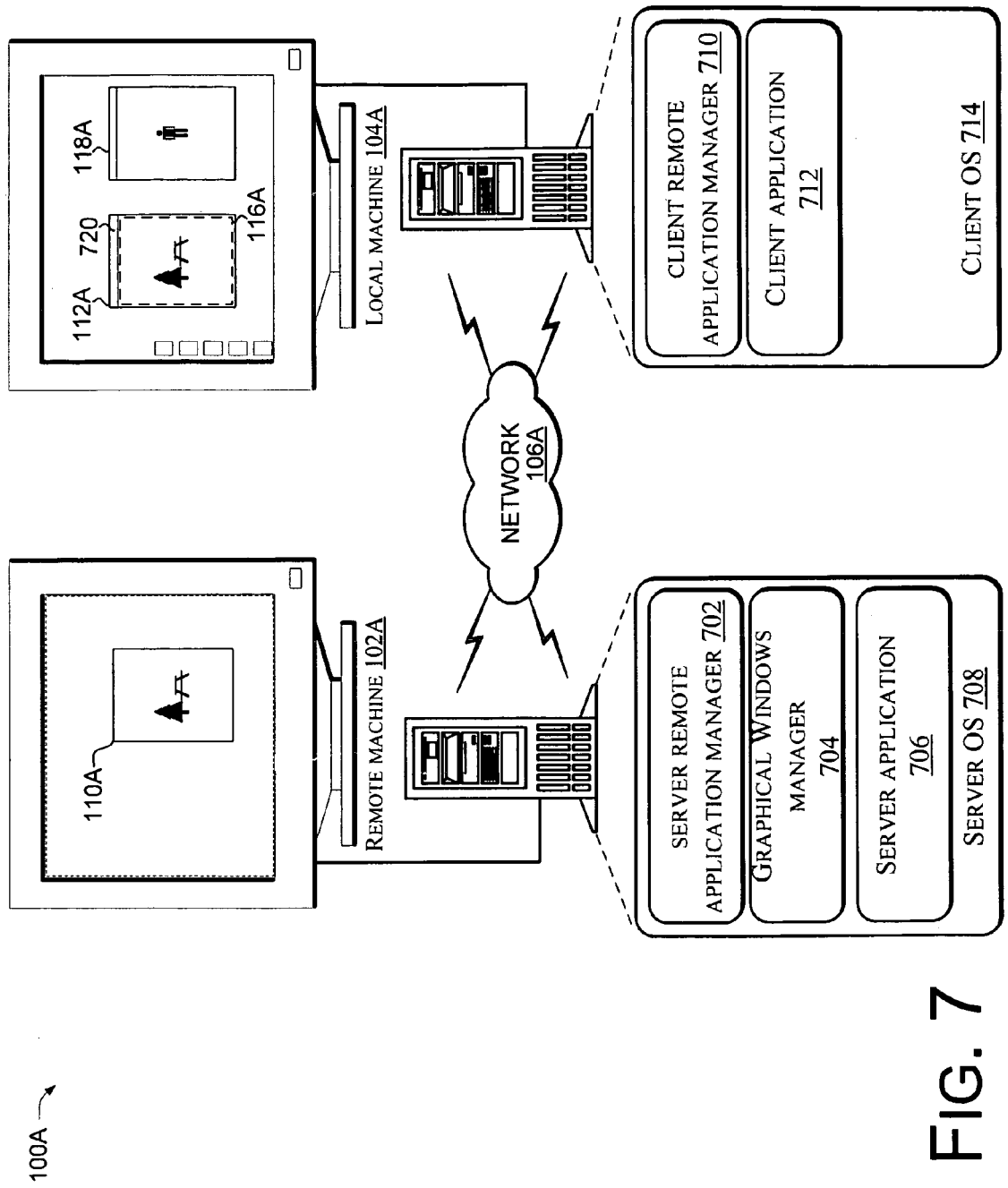
FIG. 7 illustrates an exemplary system for enabling a graphical window modification command to be applied to a remotely generated graphical window in accordance with one implementation.

Consider FIG. 7 which illustrates a system 100A configured to provide a similar appearance or user-interface for user modification commands relative to locally generated application graphical windows and remotely generated application graphical windows. System 100A is configured to support a remote terminal session between a remote machine 102A and a local machine 104A over a network 106A.

Remote machine 102A includes a server remote application manager 702, a graphical windows manager 704, and one or more server applications 706 operating on a server operating system (OS) 708. Local machine 104A includes a client remote application manager 710, and may include one or more client applications 712 operating on a client operating system (OS) 714. Examples of server applications 706 and client applications 712, as used herein, can include any code means that opens a graphical interface. For instance, such applications can include word processing applications, spreadsheet applications, messaging applications, notepad type applications, graphics applications, file browser tools such as Windows Explorer brand file browser offered by Microsoft Corporation, control panel tools, graphical tools for adding hardware, network connections, and video games, among others.

System 100A is configured such that a user at the local machine 104A can modify, such as move/resize, locally generated application graphical windows, such as application graphical window 118A, and remotely generated application graphical windows, such as remotely generated application graphical window 116A and receive a similar or identical user-interface in both instances. For instance, if the user has selected an outline mode for move/resize graphical window operations, then system 100A is configured to provide outline mode move/resize operations for both locally generated application graphical windows and remotely generated application graphical windows.

System 100A is configured to determine a user-selected move/resize mode of the local machine. System 100A is then configured to handle user graphical window move/resize commands based upon the user selected mode for application graphical window move/resize operations whether the graphical window is locally generated or remotely generated. User commands relating to locally generated application graphical windows are handled at the local machine in a traditional manner. System 100A is configured to handle user commands relating to a remotely generated application graphical window based upon the user selected mode. If the user has selected full-image mode, the commands are handled on the server side with the results evidenced on the client side. If the user has selected outline mode, then system 100A is configured to initiate move/resize commands upon the client proxy graphical window 112A and then the server side application graphical window 110A is updated accordingly to resynchronize the proxy graphical window 112A and the remotely generated application graphical window 116A. Several components of system 100A are described below in relation to achieving the above mentioned functionality.

Server remote application manager 702 is configured to facilitate a remote terminal session functionality on the server side. The server remote application manager is configured to manage server application 706 such that a representation of the server application graphical window 110A can be sent to the local machine 104A in a remote terminal session. The server remote application manager 702 is also configured to facilitate transfer of data related to the server application graphical window 110A from the server to the client. For instance, multiple applications may be running on the server while only one of the applications is being remoted to client 104A. In some implementations, the server remote application manager 702 is configured to ensure that data from the appropriate application window is sent to the client.

Graphical windows manager 704 is configured to handle user interactions relative to individual server graphical windows. The graphical windows manager handles interactions with individual graphical windows beginning with launching an individual graphical window through a user command, such as a mouse click on an application's icon. The graphical windows manager opens the graphical window responsive to the user command and subsequent user commands relating to the graphical window are directed through the graphical windows manager. In this instance, the server remote application manager 702 is further configured to ask the graphical windows manager 704 to inform the server remote application manager 702 about any graphical window related events. The graphical windows manager then informs the server remote application manager when new graphical windows are launched, when graphical windows are moved and/or resized, and minimized, among other events. The server remote application manager 702 is configured to analyze the information that it receives from the graphical windows manager 704 and to determine what, if any, of the information relates to graphical windows which are being remoted to the client in a remote terminal session. The server remote application manager also is configured to relay information to the client relating to the graphical window(s) involved in the remote terminal session. For instance, the server remote application manager 702 may send information to the client to facilitate synchronization between the server application graphical window and the corresponding client proxy graphical window.

The client remote application manager 710 is configured to establish a remote terminal session with the server and to handle interconnections with the server related to the remote terminal session. The client remote application manager is also configured to cause a proxy graphical window 112A to be generated on local machine 104A and to cause the representation of the server application graphical window 110A to be painted over the proxy graphical window 112A in the form of remotely generated application graphical window 116A. The client remote application manager 710 is further configured to handle details relating to the size and dimensions of the client's proxy graphical window 112A based, at least in part, on information received from the server remote application manager 702 regarding the corresponding server application graphical window 110A.

The client remote application manager 710 is also configured to receive information regarding a move/resize mode of local machine 104A. For instance, and as mentioned above, in some implementations, the local machine can be in outline mode or full-window mode. The client remote application manager 710 is configured to share the move/resize mode of the local machine with server remote application manager 702.

The client remote application manager 710 is also configured to forward client commands regarding an individual proxy graphical window to remote machine 102A where the commands are received by server remote application manager 702. The server remote application manager is configured to implement the client commands on the server side in cooperation with the graphical windows manager 704.

System 100A is configured to detect user commands relating to modifying a graphical window involved in a remote terminal session, such as proxy graphical window 112A. For instance, such detection can be accomplished by the client remote application manager 710 or on the server side, such as by the server remote application manager 702. For instance, the server remote application manager 702 can be configured to evaluate the window commands relating to proxy graphical window 112A to detect if the user is instigating a graphical window move or resize relative to proxy graphical window 112A. A user can start a graphical window move/resize utilizing one of multiple potential avenues. For instance, the user can send a graphical window move/resize appropriate system-command, such as by using a system menu. In another example the user can press the mouse button on a graphical window caption/border and then drag the graphical window. For instance, to accomplish a graphical window move/resize command a user can mouse click on a non-workspace portion of the graphical window. Such non-workspace portions can include among others, an edge (illustrated FIGS. 1-6) or a caption 720, as indicated in respect to proxy graphical window 112A. In many configurations, a user clicks on an edge of the graphical window if the user desires to resize the graphical window and clicks on the caption if the user desires to move the graphical window.

In an instance where a move/resize is detected, system 100A is further configured to differentiate a graphical window move from a graphical window resize. Based upon whether the local machine is in a full-image mode or outline mode as mentioned above, system 100A is configured to take an appropriate action to accomplish the user command. In one such example of a particular system configuration, the server remote application manager 702 is configured to detect a user move/resize command relative to a proxy graphical window of a remote terminal session between remote machine 102A and local machine 104A. The server remote application manager 702 is also configured to take appropriate actions to accomplish the move/resize command consistent with a user selected move/resize mode of either full-image mode or outline mode.

In this instance, the server remote application manager 702 is configured to determine whether the user command relates to a window/resize operation relative to a graphical window involved in the remote terminal session. Once a determination is made that a move resize command is being initiated, the server remote application manager 702 takes an action based on the user selected graphical window move/resize mode. In this particular implementation, if the move/resize mode is full-image, then server remote application manager 702 handles the command at the server and updates the server application graphical window 110A accordingly. As the server application graphical window is updated, corresponding representations are sent to the client, and the representations are manifested as an updated remotely generated application graphical window 116A. The size or location of the proxy graphical window 112A is adjusted to correspond to the updated remotely generated application graphical window 116A.

Further, in this implementation, in an event that the user selected move/resize mode is outline mode, the server remote application manager 702 is configured to send the user commands to the client remote application manager 710. An outline of the proxy graphical window 112A reflecting the user command is generated on client desktop 116A. Upon completion of the client command, positional data relating to the new size and/or location of the proxy graphical window is sent to the remote machine where the server application graphical window is updated to synchronize with the new proxy graphical window. An updated representation is sent to the local machine and manifested as an updated remotely generated application graphical window 116A which is painted over the proxy graphical window 112A.

Alternatively or additionally, to the implementation mentioned above which distinguishes between outline and full-image modes, system 100A can handle both full screen and outline modes in the same manner. For instance, regardless of a user selected mode, such as outline or full screen, system 100 can receive the user move/resize commands at the server, and send the user move/resize commands and/or related data to the client. The user commands can be initiated on the client side, with the server side being subsequently updated to re-synchronize the server and the client. Similarly, system 100A may, in some instances, decide to initiate all user commands on the server side regardless of a user-selected modification mode.

Figure 8:
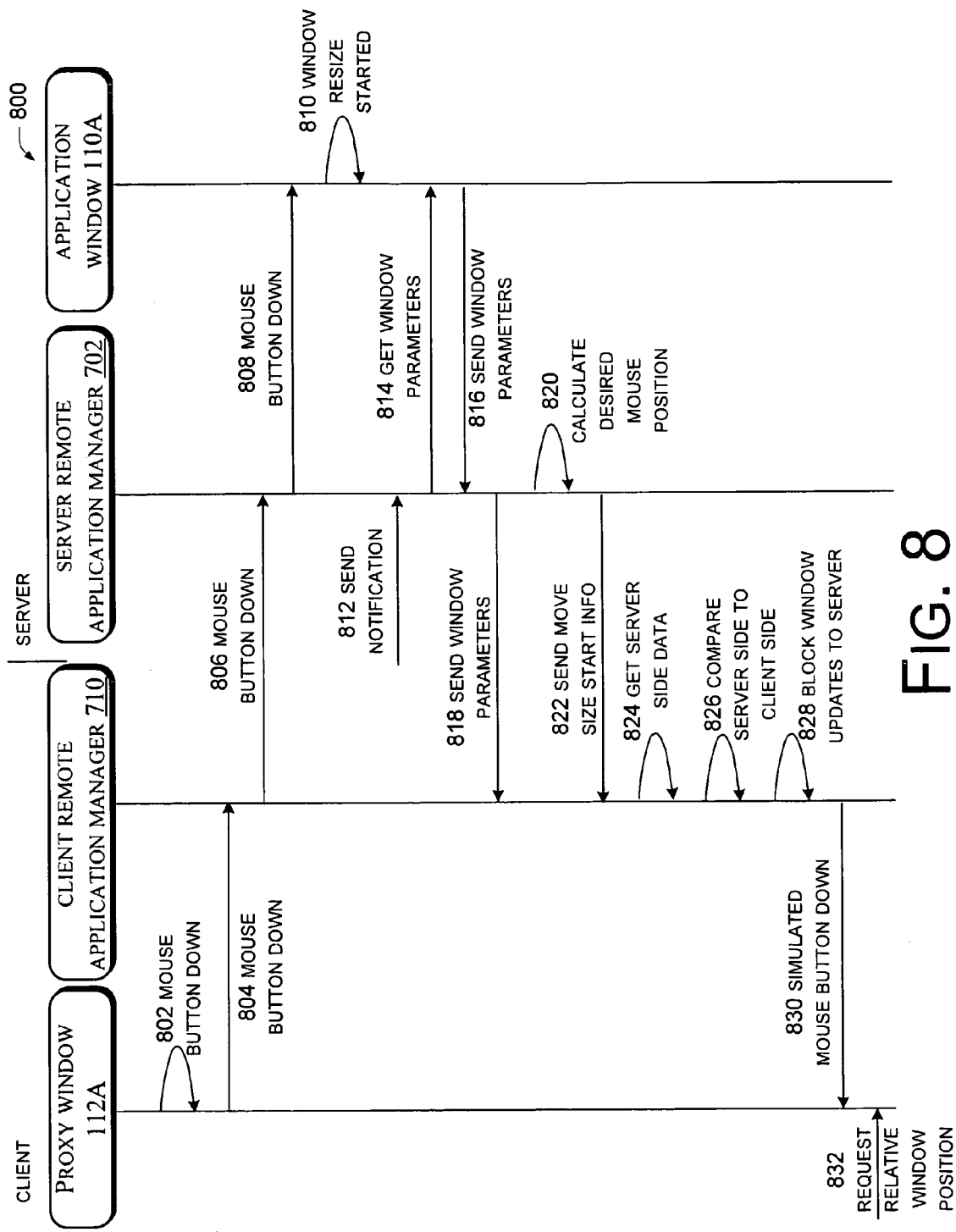
FIGS. 8-9 illustrate an exemplary process diagram of one system configuration for enabling a graphical window modification command to be applied to a remotely generated graphical window in accordance with one implementation.
Figure 9:
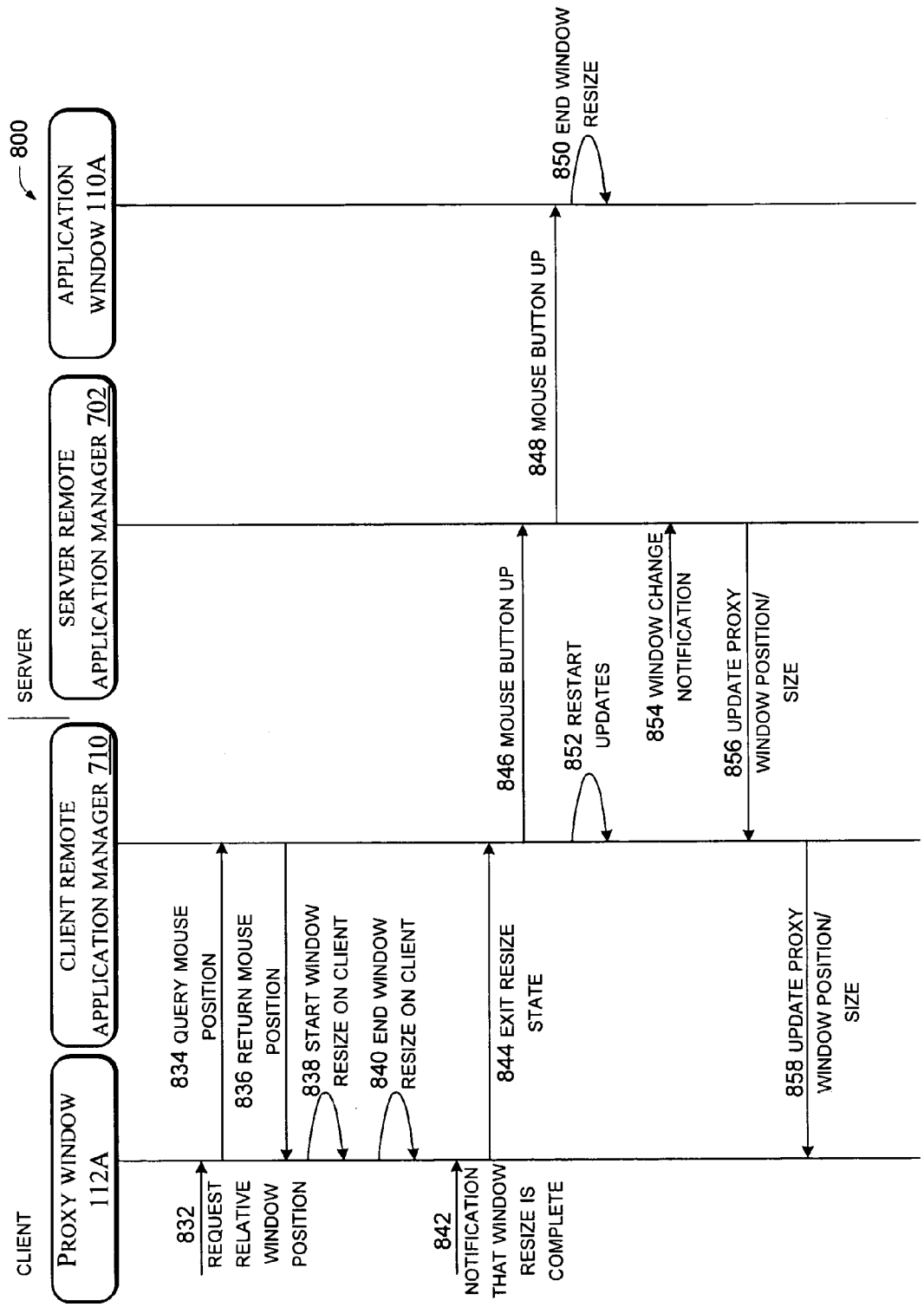

Consider FIGS. 8-9 which collectively illustrate a process 800 which provides an example of how system 100A can provide a similar user-interface for user move/resize commands relative to locally generated application graphical windows and remotely generated application graphical windows. Of course, system 100A provides but one structural configuration which can honor a user selected move/resize mode for both locally generated and remotely generated application graphical windows. FIGS. 8-9 involve a scenario where the user of local machine 104A has selected an outline move/resize mode for application graphical windows of local machine 104A. As mentioned above, other implementations may handle outline mode and full-image mode in the same manner rather than distinguishing between the two. Similarly, while this example is provided in the context of a window/move resize scenario, the process can be applied to other user commands to modify a remotely generated application window.

At step 802 a user's mouse button down command is detected on the proxy graphical window of the local machine. At step 804 a mouse button down notification is sent to the client remote application manager 710. Since the server remote application manager 702 has not yet instructed the client remote application manager to initiate a client side resize, the process proceeds to forward the mouse button down information to the server side at step 806.

At step 806 the mouse button down notification is sent from the client side to the server side. In this particular configuration, the mouse button down notification is sent from the client remote application manager 710 to the server remote application manager 702. The server remote application manager forwards the mouse button down notification to the server application graphical window 110A at step 808.

At step 810 the graphical window resize is started at the server application window 110A. In at least some implementations, detection of the user action occurs after the user action occurs. For instance, a user may click on a corner of a window and begin to drag the window with the mouse, the window resize process starts at a time subsequent to the user click. As such, the graphical window resize is not started on the server application window until after the user action actually begins from the perspective of the user. Such implementations avoid scenarios in which a process erroneously predicts that a user intends to start a resize command and starts an associated resize.

At step 812 the process sends a notification to the server remote application manager 702 stating that a particular graphical window is being resized. Some implementations may send a notification stating that a graphical window is being moved or resized with appropriate parameters to distinguish whether a move or resize is occurring. In some configurations, associated parameters for this event can indicate the type of move/resize.

At step 814 a get graphical window parameters request is sent from server remote application manager 702 to server application graphical window 110A. The get graphical window parameters request is utilized to ensure that the proxy graphical window is not resized at the client beyond limits imposed by the server. At step 816, the process sends graphical window parameters from the server application graphical window 710 to server remote application manager 702.

At step 818, the process sends the graphical windows parameters from the server side to the client side. In this particular configuration, the graphical window parameters are sent from server remote application manager 702 to the client remote application manager 710.

At step 820 the process calculates the desired mouse position. This step addresses potential latency issues associated with communications between the local and remote machines. For instance, when the user clicked the mouse button on the client side in a first position over the proxy graphical window and started to move the mouse to a new position, latency or delay may result in the user having moved or dragged the mouse to a second position. To avoid erroneous results, the mouse is effectively put back in the first position before the mouse input detected at the server is imposed back upon the client. This step effectively restores the state to the point when the user 'clicked' the mouse.

For purposes of explanation, assume that the mouse was at $x_0 y_0$ on the local machine when the client clicked the mouse, and because of latency, at a subsequent time when the data comes back to the client from the server, the mouse is at $x_1 y_1$. This step moves the mouse back to $x_0 y_0$, initiates the click and then quickly drags the mouse back to $x_1 y_1$. Such a process is generally too fast for the user to detect. This step serves to avoid a situation where the user clicks on one application graphical window and drags the mouse onto another graphical window, and lacking such a latency adjustment, the process may miss the first application graphical window entirely and start dragging the second application graphical window. This step restores the mouse back to the original position and then moves it to the new position. In many instances this process happens so fast that the user simply sees a drag graphical window appear at the last place the mouse occurred.

At step 822 the process sends move/resize start information from the server side to the client side, such as from the server remote application manager 702 to the client remote application manager 710. This step serves to send the proper mouse position from the server side to the client side.

At step 824 the process gets data relating to the server side graphical window position. The data in relation to the graphical window may indicate a right edge, left edge, corner, caption, among others. The process utilizes this data, at least in part to determine if a resize should be undertaken. So this step provides information which allows the process to determine the intended user command. For instance, did the user intend to extend the right side of the graphical window, or did the user intend to extend the graphical window to the bottom and to the right.

At step 826 the process compares the client side proxy window location to the server side graphical window position. The mouse position that the server sends contains coordinates relative to the server. This process converts the server coordinates to client coordinates. This step may be eliminated in some instances. The mouse position sent by the server is translated to map the mouse position on the client proxy graphical window. For instance, in at least some implementations, this translation is done as follows for a rectangular window shape:

Mouse cursor X=Client window rectangle left+offset X of window and mouse position on server Mouse cursor Y=Client window rectangle top+offset Y of window and mouse position on server A rectangular graphical window shape is a common shape and provides a foundation for explanation. The skilled artisan should recognize that the process also lends itself to be utilized with other graphical window shapes.

At step 828 the process blocks graphical window updates to the server side. By this time, the process recognizes that a resize is happening, or is going to happen, on the client side. This step can be accomplished among other ways, by setting some type of flag which tells the server side to stop updating the application graphical window until the resize is completed. From the server's point of view, the resize would still be happening but the user would have stopped moving the mouse. Such a step can serve to save processing resources.

At step 830, the process sends a simulated mouse button down command from the client remote application manager 710 to the proxy graphical window 112A. This step serves to accomplish the original mouse button down command detected at step 802. Recall that at step 802 the mouse button down command was not enacted, but was ultimately sent to the server side. Step 830 serves to accomplish, at the client, the original mouse button down detected at step 802.

At step 832, the process requests a relative graphical window position corresponding to the original mouse button down position detected at step 802. For example, the request is directed to correlating the mouse button down position to a relative graphical window position. For instance, does this point correspond to the graphical window's right edge, left edge, bottom right corner, etc?

At step 834 the process queries the client remote application manager for mouse positional data translated from the mouse position corresponding to the mouser button down position of step 806. At step 836 the client remote application manager 710 returns the mouse positional data corresponding to the mouse position.

At step 838 the process starts the graphical window resize on the client side. At step 840 the process ends the graphical window resize on the client side.

At step 842 the process receives notification that the graphical window resize is complete. At step 844 the process exits the resize state. For instance, the client remote application manager 710 may receive notification to exit the resize process in the form of a mouse button up command.

At step 846, the mouse button up command is sent from the client side to the server side, such as from the client remote application manager 710 to the server remote application manager 702. At step 848, the client remote application manager provides the mouse button up command to the server application graphical window. This series of steps (844-848) corresponds to the mouse button down command described in relation to steps 804-808 and serves to restore a system or process normal condition.

At step 850 the process ends the graphical window resize on the server application graphical window. At step 852 the process restarts server updates regarding the server application graphical window. At step 854 the process provides a graphical window change location notification.

At step 856 the process updates the proxy graphical window position and/or size from the server side to the client side. At step 858 the process updates the position and/or size of the remote application proxy graphical window 112A.

The steps described in relation to FIGS. 8-9 provide but one exemplary implementation for achieving a similar user-interface for user move/resize commands relative to locally generated application graphical windows and remotely generated application graphical windows. Other implementations may have fewer or more steps to achieve a similar functionality.

Exemplary System Environment

Figure 10:
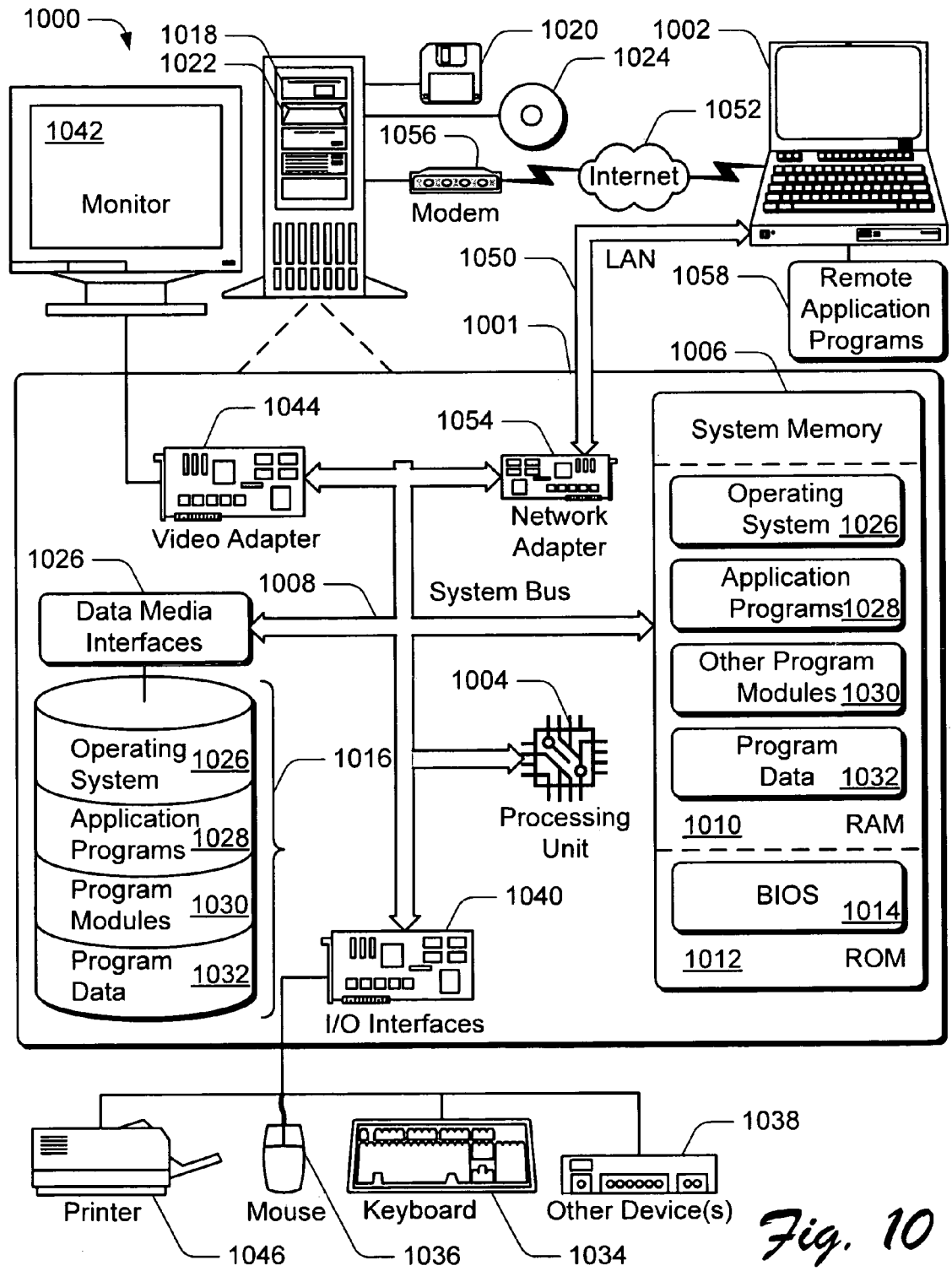
FIG. 10 illustrates exemplary systems, devices, and components in an environment for enabling a graphical window modification command to be applied to a remotely generated graphical window in accordance with one implementation.

FIG. 10 represents an exemplary system or computing environment 1000 configured to enable a graphical window modification mode to be applied to a remotely generated graphical window. System 1000 includes a general-purpose computing system in the form of a first machine 1001 and a second machine 1002. In this instance, the first and second machines are configured to support a remote terminal session such that either of the first and second machines can act as a local machine upon which a user operates and the other of the first and second machines can act as the remote or server machine.

The components of first machine 1001 can include, but are not limited to, one or more processors 1004 (e.g., any of microprocessors, controllers, and the like), a system memory 1006, and a system bus 1008 that couples the various system components. The one or more processors 1004 process various computer executable instructions to control the operation of first machine 1001 and to communicate with other electronic and computing devices. The system bus 1008 represents any number of several types of bus structures, including a memory bus or memory controller, a peripheral bus, an accelerated graphics port, and a processor or local bus using any of a variety of bus architectures.

System 1000 includes a variety of computer readable media which can be any media that is accessible by first machine 1001 and includes both volatile and non-volatile media, removable and non-removable media. The system memory 1006 includes computer-readable media in the form of volatile memory, such as random access memory (RAM) 1010, and/or non-volatile memory, such as read only memory (ROM) 1012. A basic input/output system (BIOS) 1014 maintains the basic routines that facilitate information transfer between components within first machine 1001, such as during start-up, and is stored in ROM 1012. RAM 1010 typically contains data and/or program modules that are immediately accessible to and/or presently operated on by one or more of the processors 1004.

First machine 1001 may include other removable/non-removable, volatile/non-volatile computer storage media. By way of example, a hard disk drive 1016 reads from and writes to a non-removable, non-volatile magnetic media (not shown), a magnetic disk drive 1018 reads from and writes to a removable, non-volatile magnetic disk 1020 (e.g., a "floppy disk"), and an optical disk drive 1022 reads from and/or writes to a removable, non-volatile optical disk 1024 such as a CD-ROM, digital versatile disk (DVD), or any other type of optical media. In this example, the hard disk drive 1016, magnetic disk drive 1018, and optical disk drive 1022 are each connected to the system bus 1008 by one or more data media interfaces 1026. The disk drives and associated computer readable media provide non-volatile storage of computer readable instructions, data structures, program modules, and other data for first machine 1001.

Any number of program modules can be stored on the hard disk 1016, magnetic disk 1020, optical disk 1024, ROM 1012, and/or RAM 1010, including by way of example, an operating system 1026, one or more application programs 1028, other program modules 1030, and program data 1032. Each of such operating system 1026, application programs 1028, other program modules 1030, and program data 1032 (or some combination thereof) may include an embodiment of the systems and methods described herein.

A user can interface with first machine 1001 via any number of different input devices such as a keyboard 1034 and pointing device 1036 (e.g., a "mouse"). Other input devices 1038 (not shown specifically) may include a microphone, joystick, game pad, controller, satellite dish, serial port, scanner, and/or the like. These and other input devices are connected to the processors 1004 via input/output interfaces 1040 that are coupled to the system bus 1008, but may be connected by other interface and bus structures, such as a parallel port, game port, and/or a universal serial bus (USB).

A monitor 1042 or other type of display device can be connected to the system bus 1008 via an interface, such as a video adapter 1044. In addition to the monitor 1042, other output peripheral devices can include components such as speakers (not shown) and a printer 1046 which can be connected to first machine 1001 via the input/output interfaces 1040.

First machine 1001 can operate in a networked environment using logical connections to one or more remote computers, such as second machine 1002. By way of example, the second machine 1002 can be a personal computer, portable computer, a server, a router, a network computer, a peer device or other common network node, and the like. The second machine 1002 is illustrated as a portable computer that can include many or all of the elements and features described herein relative to first machine 1001.

Logical connections between first machine 1001 and the second machine 1002 are depicted as a local area network (LAN) 1050 and a general wide area network (WAN) 1052. Such networking environments are commonplace in offices, enterprise-wide computer networks, intranets, and the Internet. When implemented in a LAN networking environment, the first machine 1001 is connected to a local network 1050 via a network interface or adapter 1054. When implemented in a WAN networking environment, the first machine 1001 typically includes a modem 1056 or other means for establishing communications over the wide area network 1052. The modem 1056, which can be internal or external to first machine 1001, can be connected to the system bus 1008 via the input/output interfaces 1040 or other appropriate mechanisms. The illustrated network connections are exemplary and other means of establishing communication link(s) between the first and second machines 1001, 1002 can be utilized.

In a networked environment, such as that illustrated with System 1000, program modules depicted relative to the first machine 1001, or portions thereof, may be stored in a remote memory storage device. By way of example, remote application programs 1058 are maintained with a memory device of second machine 1002. For purposes of illustration, application programs and other executable program components, such as the operating system 1026, are illustrated herein as discrete blocks, although it is recognized that such programs and components reside at various times in different storage components of the first machine 1001, and are executed by the processors 1004 of the first machine.

Exemplary Processes

Figure 11:
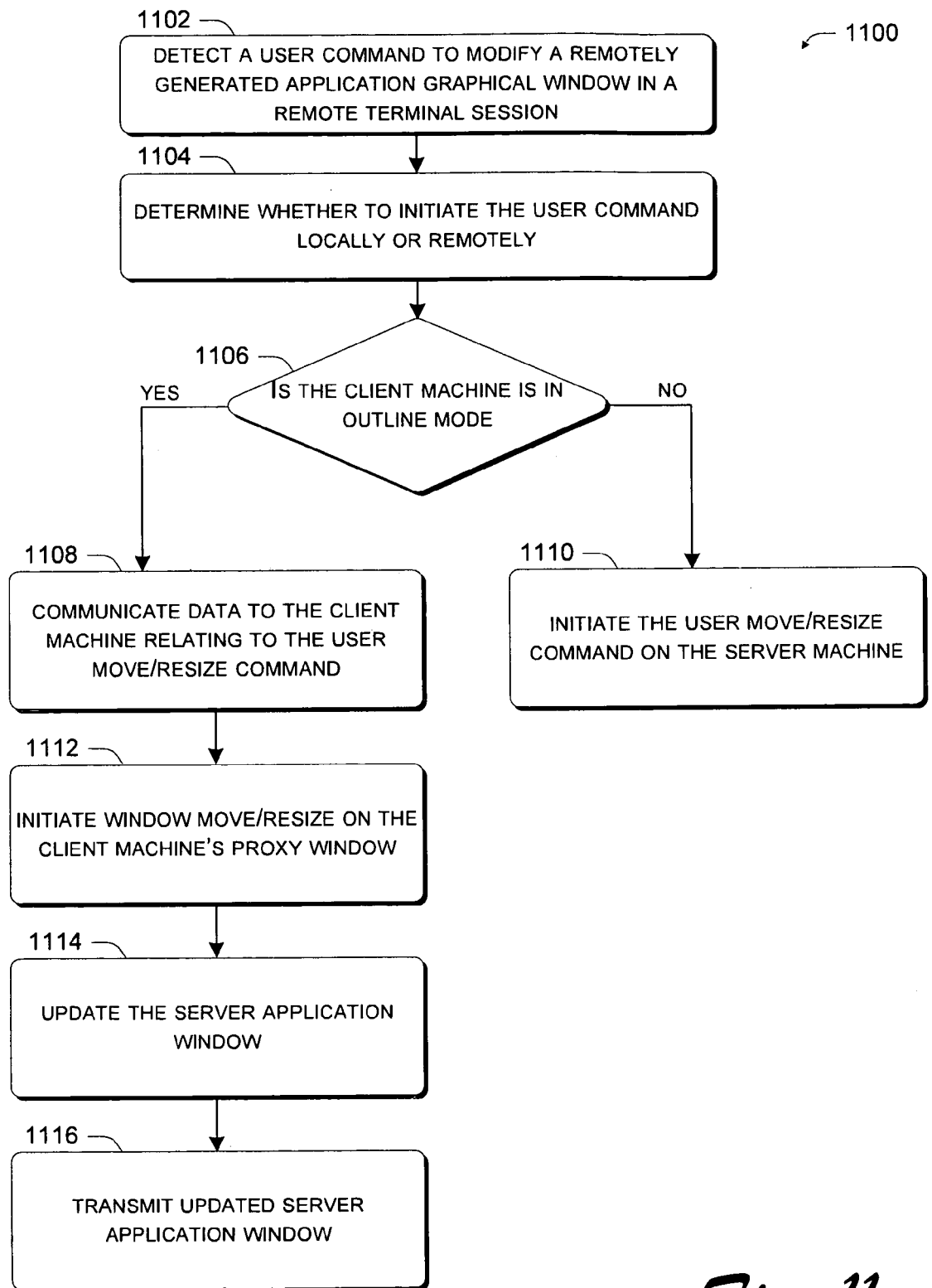
FIG. 11 illustrates an exemplary process diagram for enabling a graphical window modification command to be applied to a remotely generated graphical window in accordance with one implementation.

FIG. 11 illustrates an exemplary process 1100 for enabling a graphical window modification command to be applied to a remotely generated graphical window. The order in which the process is described is not intended to be construed as a limitation, and any number of the described process blocks can be combined in any order to implement the process. Furthermore, the process can be implemented in any suitable hardware, software, firmware, or combination thereof.

At block 1102, the process detects a user command to modify a remotely generated application graphical window in a remote terminal session. A remote terminal session can provide remote application capabilities. The remote terminal session serves to remote an application graphical window from a first or server machine to a second or client machine. A proxy window is created on the client machine and display data from the server application graphical window is painted over this proxy window to create the remotely generated application graphical window. Various avenues are available for a user to issue commands relating to modifying a graphical window. For instance, the user may send a window appropriate system-command by using the system menu as should be recognized by the skilled artisan. In another example, the user may press a mouse button on the graphical window's caption or border and then drag the graphical window. Various other examples of user input can include, voice recognition commands, and camera detected movements of the user, among others.

In some implementations, user modification commands related to the proxy graphical window are detected at the client machine. In other implementations, user input or commands related to the proxy graphical window are automatically sent to the server machine as part of the remote terminal session. In such instances, detection of the user commands relating to window modification may occur at the server machine. But one example of a system configured to detect the user window modification commands relating to the remotely generated application graphical window is described above in relation to FIG. 7.

At block 1104, the process determines whether to initiate the user command at a local machine upon which the remotely generated application graphical window is displayed or a remote machine which generated the remotely generated application graphical window. In some implementations, all modifications may be initiated at the server. In other implementations, all modifications may be initiated at the client. Still other implementations, initiate some user modification commands on the server, while user modification commands are initiated at the client. Blocks 1106-1116 provide but one exemplary example of how such a determination can be achieved and how the client modification command can be accomplished such that in a first scenario the user commands are initiated at the server, and in a second scenario the user commands are initiated at the client.

The process described in relation to blocks 1106-1116 adjusts the process based upon a user selected mode for a client modification mode, such as full-image or outline. Such implementations, in some circumstances, may be able to offer a more aesthetically pleasing user-interface when compared with other processes. As noted above, other exemplary processes treat all modification modes the same rather than distinguish between the available modes and tailoring the response accordingly.

In this particular implementation, at block 1106, the process establishes whether the client machine is in outline mode. In some instances, the user has previously selected a graphical window move/resize mode, or lacking such a user selection the client machine may default to a particular mode. In either case, the graphical window move/resize mode can be distributed from the client machine to the server machine. For example, the client machine may automatically report its graphical window move/resize mode. In other configurations, the server machine may query the client machine about the window move/resize mode. In instances, where the client machine is in outline mode, then the process proceeds to block 1108, otherwise the process proceeds to block 1110.

At block 1108, the process communicates data to the client machine relating to the user move/resize command. The process then proceeds to block 1112.

At block 1110, the process initiates the user move/resize command on the server machine. For instance, the server application graphical window may be updated to reflect the user command. Communications for updating the client proxy graphical window are utilized to update the client side and the updated server application graphical window is remoted and painted over the updated proxy graphical window.

At block 1112, the process initiates graphical window move/resize on the client machine's proxy graphical window. In one implementation, the client receives move/resize start information from the server machine and starts a corresponding move/resize on the proxy graphical window of the remote application. The manner in which the graphical window move/resize is started can depend on how the user issued move/resize command was started originally. For instance, if the user started move/resize utilizing a system menu, then a system command message can be posted to the proxy graphical window with an appropriate system-command. For mouse initiated move/resize, the client performs the corresponding action on the proxy graphical window.

At block 1114, the process updates the server application graphical window responsive to completion of the user command on the client side proxy graphical window. At block 1116, the process transmits the updated server application graphical window to resynchronize the remotely generated application window and the client proxy graphical window.

Although implementations relating to enabling a graphical window modification command to be applied to a remotely generated graphical window have been described in language specific to structural features and/or methods, it is to be understood that the subject of the appended claims is not necessarily limited to the specific features or methods described. Rather, the specific features and methods provide examples of implementations for the concepts described above and below.

The invention claimed is:

1. A method, comprising:
    generating an application graphical window at a first machine;
    sending a representation of the application graphical window to a second machine consistent with a remote terminal session;

detecting a user command from the second machine to modify the representation;

transmitting the user command from the second machine to the first machine;

determining whether the first machine is capable of initiating the user command;

if the first machine is not capable of initiating the user command, communicating data relating to the user command to the second machine to allow the second machine to modify a corresponding client proxy graphical window;

responsive to completion of the user command upon the client proxy graphical window, updating the application graphical window to correspond to the proxy graphical window; and transmitting an updated representation of the application graphical window to the second machine; and otherwise, initiating the user command to modify the application graphical window at the first machine.

2. The method as recited in claim 1, wherein the determining is based on a mode of application.

3. The method as recited in claim 1, wherein the determining is based on a mode of the application graphical window.

4. The method as recited in claim 1 further comprising determining whether the application graphical window is in a full-window mode or an outline mode.

5. The method as recited in claim 4, wherein:

the full window mode updates the entire application graphical window during the modification, and the outline mode updates a line indicating a new position and size of the application graphical window during the modification.

6. The method as recited in claim 4, wherein responsive to determining that the application graphical window is in the full window mode, transmitting an updated representation of the application window to the second machine.

7. A computer-readable storage media comprising computer-executable instructions that, when executed, perform acts, comprising:

detecting a user command to modify a remotely generated application graphical window in a remote terminal session;

determining whether to initiate the user command at a local machine upon which the remotely generated application graphical window is displayed or a remote machine which generated the remotely generated application graphical window; and initiating the user command to modify the remotely generated application window at the remote machine which generated the remotely generated application graphical window in response to a result of said determining, wherein said initiating the user command at the remote machine comprises:

updating the remotely generated application graphical window on the remote machine in response to the user command;

transmitting an updated representation of the remotely generated application graphical window to the local machine; and modifying size or location of a proxy graphical window at the local machine corresponding to the updated remotely generated application graphical window.

8. The computer-readable storage media as recited in claim 7, wherein the determining is based on a mode of an application.

9. The computer-readable storage media as recited in claim 7, wherein the determining is based on a mode of the remotely generated application graphical window.

10. The computer-readable storage media as recited in claim 9 further comprising determining whether the remotely generated application graphical window is in a full-window mode or an outline mode.

11. The computer-readable storage media as recited in claim 10, wherein:

the full window mode updates the entire remotely generated application graphical window during the modification, and the outline mode updates a line indicating a new position and size of the remotely generated application graphical window during the modification.

12. The computer-readable storage media as recited in claim 11 further comprising responsive to determining that the remotely generated application graphical window is in the outline mode, initiating the user command to modify the remotely generated application graphical window at a local machine upon which the remotely generated application graphical window is displayed.

13. A system embedded in a computer readable storage medium, the system comprising:

means for generating an application graphical window at a first machine;

means for sending a representation of the application graphical window to a second machine consistent with a remote terminal session;

means for detecting a user command from the second machine to modify the representation;

means for transmitting the user command from the second machine to the first machine;

means for determining whether the first machine is capable of initiating the user command;

if the first machine is not capable of initiating the user command, communicating data relating to the user command to the second machine to allow the second machine to modify a corresponding client proxy graphical window;

responsive to completion of the user command upon the client proxy window, updating the application graphical window to correspond to the proxy graphical window;

transmitting an updated representation of the application graphical window to the second machine; and otherwise, initiating the user command to modify the application graphical window at the first machine.

14. The system as recited in claim 13, wherein the means determining is based on a mode of application.

15. The system as recited in claim 14, wherein the means for determining is based on a mode of the application graphical window.

16. The system as recited in claim 13 further comprising means for determining whether the application graphical window is in a full-window mode or an outline mode.

17. The system as recited in claim 16, wherein:

the full window mode updates the entire application graphical window during the modification, and the outline mode updates a line indicating a new position and size of the application graphical window during the modification.

18. The system as recited in claim 17, wherein responsive to determining that the application graphical window in the outline mode, updating the line indicating the new position and size and transmitting an updated representation of the application window to the second machine.

19. The system as recited in claim 16, wherein responsive to determining that the application graphical window is in the full window mode, transmitting an updated representation of the application window to the second machine.

20. The system as recited in claim 16 further configured to differentiate an application graphical window move from an application graphical window resize.

* * * * *